Patented Feb. 3, 1942

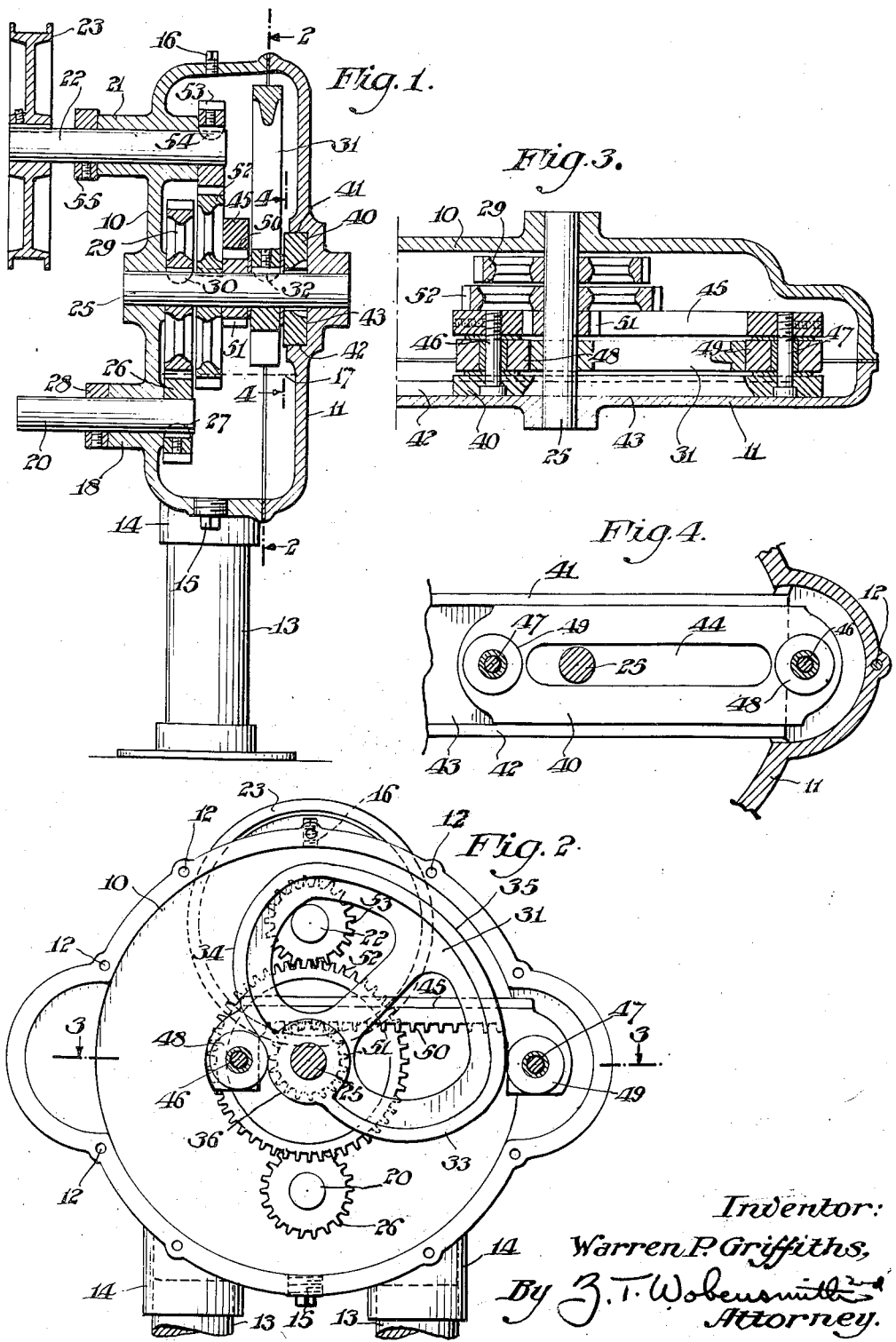

2,271,513

UNITED STATES PATENT OFFICE 2,271,513

RECIPROCATING MECHANISM

Warren P. Griffiths, Trenton, N. J.

Application July 29, 1941, Serial No. 404,457

7 Claims. (Cl. 74—76)

This invention relates to reciprocating mechanisms and more particularly to a mechanism which is adapted to translate continuous rotary motion to reciprocatory motion. The invention further relates to a reciprocating mechanism which is particularly adapted for use on textile machinery, such as weaving looms, for operation of the needles of Axminster looms, for operation of weft pile wires, and for numerous other purposes.

It is the principal object of the present invention to provide an improved reciprocating mechanism which will be free from operating difficulties.

It is a further object of the present invention to provide a reciprocatory motion which is simple in construction, which is adequately lubricated and which is protected from tampering and misadjustment.

Other objects of the invention will be apparent from the annexed specification and claims.

The nature and characteristic features of the invention will be more readily understood from the following description, taken in connection with the accompanying drawing forming part hereof, in which:

Figure 1 is a vertical central sectional view showing a preferred embodiment of the present invention;

Fig. 2 is a vertical sectional view taken approximately on the line 2—2 of Fig. 1;

Fig. 3 is a horizontal sectional view taken approximately on the line 3—3 of Fig. 2; and Fig. 4 is a fragmentary vertical sectional view taken approximately on the line 4—4 of Fig. 1.

It will, of course, be understood that the description and drawing herein are illustrative merely, and that various modifications and changes may be made in the structure disclosed without departing from the spirit of the invention.

Referring more particularly to the drawing there is provided a casing 10 and complemental casing cover 11 secured to the casing 10 in fluid tight relationship by means of bolts threaded into said casing as at 12 for enclosing the operating parts of the mechanism. The casing 10 is supported in any desired manner such, for example, as by legs 13 adjustably secured within downwardly extending bosses 14 formed on the casing 10. The casing cover 11 is removable for access to the interior for assembly and for inspection.

The casing 10 is provided at the lower portion thereof with a threaded drain plug 15 and at the upper portion thereof with a threaded plug 16 for introducing lubricant into the casing so that the parts within the casing will at all times be suitably lubricated. The normal level of the lubricant is indicated at 17.

At the lower part of the casing 10 a boss 18 is provided within which a lower shaft 20 is journalled, the shaft 20 being adapted to be continuously driven in any desired manner and at a suitable speed. The lower drive shaft 20 may, if desired, be driven from the driving shaft of a loom. A boss 21 is also provided at the upper part of the casing 10 and a driven or take-off shaft 22 is journalled therein, the shaft 22 preferably carrying at the outer end thereof a pulley 23 for transmitting the reciprocatory motion.

An intermediate shaft 25 is also provided, and journalled at its ends in the casing 10 and in the casing cover 11 for purposes hereinafter pointed out.

On the lower shaft 20 a gear 26 is provided, the gear 26 being keyed to the shaft 20 by means of a key 27. A collar 28 is secured to the shaft 20 for positioning the shaft 20 and the gear 26. The intermediate shaft 25 has a gear 29 keyed thereto by means of a key 30, the gear 29 meshing with the gear 26 and preferably having a greater number of teeth than the gear 26. The intermediate shaft 25 also has a cam 31 keyed thereto by means of a key 32.

The cam 31 may be of any desired shape in accordance with the character of motion desired at the take-off shaft 22. For certain purposes, a timed predetermined movement in one direction, an equal predetermined period of rest or dwell, an equal timed return movement in the opposite direction, and a repetition of the same predetermined period of rest or dwell for each cycle of operations, with the cycles repeating, are desired. For such purposes, the cam 31 is provided with a pair of eccentric actuating face portions 33 and 34 and each extending over approximately ninety degrees for providing movement in opposed directions as hereinafter pointed out. The cam 31 is preferably also provided with a pair of concentric dwell faces 35 and 36 and each located at a predetermined distance from the axis of the shaft 25, the faces 35 and 36 preferably each extending approximately ninety degrees. The lateral distance between the face portions 33 and 34 at any location is the same as the lateral distance between the face portions 35 and 36.

A slidable member is provided and includes a slide portion 40 mounted between horizontal guides 41 and 42 formed on the interior of the casing cover 11 and in engagement with an internal face 43 between the guides 41 and 42. A central opening 44 is provided in the slide portion 40 for clearance of the intermediate shaft 25. The slidable member also includes a rack portion 45 spaced from the slide portion 40 and disposed on the opposite side of the cam 31 from the slide portion 40. The slide portion 40 and the rack portion 45 are preferably connected at their ends by suitable shafts 46 and 47 on which rollers 48 and 49 are mounted for continuous engagement with the respective opposed face portions of the cam 31 for positive actuation of the slidable member upon movement of the cam 31.

The rack portion 45 is provided with teeth at 50 for engagement with a gear 51, the gear 51 being freely rotatably mounted on the shaft 25. A gear 52, also freely rotatably mounted on the shaft 25 is provided, the gear 52 being integral with or rigidly connected to the gear 51 for movement therewith. The gear 52 is in engagement with a pinion 53 carried on the upper shaft 22 and keyed thereto by means of a key 54. A suitable collar 55 may be provided on the shaft 22 and secured thereto for holding the shaft 22 in the desired location within its journal 21.

The mode of operation of the mechanism of the present invention will, it is thought, be clear from the foregoing. It may, however, be pointed out that upon rotation of the shaft 20 the rotary motion is transmitted from the shaft 20 through the gear 26 and the gear 29 to the intermediate shaft 25. The continuous rotation of the intermediate shaft 25 effects a rotary movement of the cam 31 and the cam 31 in turn operates the slidable member, the rollers 48 and 49 of which are in engagement with the periphery of the cam 31.

If it be assumed that the shaft 25 is rotated in a clockwise direction as illustrated in Fig. 2, the slidable member will remain at rest for an interval represented by ninety degrees of movement of the shaft 25 with the cam face portions 35 and 36 in engagement respectively with the rollers 49 and 48 and as the cam face portions 34 and 33 are respectively moved into engagement with the rollers 49 and 48, the slidable member will be moved toward the left. The characteristics of the movement are determined by the shaping of the cam face portions 33 and 34. This movement, with the form of cam illustrated, will be effected during the second ninety degree movement of the shaft 25. Upon the completion of this movement of the shaft 25, the cam face portions 36 and 35 will be respectively brought into engagement with the rollers 49 and 48 and the slidable member will remain at the left for an interval represented by the rotation of the shaft 25 through the third ninety degree movement. The cam face portions 34 and 33 will then be respectively brought into engagement with the rollers 48 and 49 and the slidable member returned to its initial position, as illustrated in Fig. 2, during the fourth ninety degree movement of the shaft 25.

The movement of the slidable member is transmitted through the rack 45 to the gear 51, with which the rack teeth 50 are in engagement, and rotation of the gear 51 in a particular direction causes rotation of the gear 52 in the same particular direction. The gear 52 by reason of its engagement with the pinion 53 on the shaft 22 causes the motion to be transmitted to the shaft 22 where it is available at the pulley 23. It will thus be seen that for a complete revolution of the lower shaft 20 the upper shaft 22 will be successively rotated in one direction, held at rest, returned to its initial position, and again held at rest and that this character of movement will be repeated for each revolution of the lower shaft 20.

I claim:

1. In a reciprocating mechanism, a continuously rotatable shaft, a cam member mounted on said shaft and driven thereby, a slidable member having a supporting and guiding portion on one side of said cam member and a rack portion on the other side of said cam member, spaced cam engaging members extending between said portions for simultaneous engagement with opposed faces of said cam member for actuating said slidable member, and a rack engaging member driven by said rack.

2. In a reciprocating mechanism, a continuously rotatable shaft, a cam mounted on said shaft and driven thereby, a slidable member having a rack portion disposed along one side of said cam, a pair of spaced cam engaging members carried by said slidable member in simultaneous engagement with opposed faces of said cam for actuating said slidable member, and a rack engaging member driven by said rack portion.

3. In a reciprocating mechanism, a continuously rotatable shaft, a cam mounted on said shaft and driven thereby, a slidable member having a supporting and guiding portion on one side of said cam and a rack portion on the other side of said cam, spaced cam engaging members carried by said slidable member in simultaneous engagement with opposed faces of said cam for operating said slidable member, and a rack engaging member driven by said rack.

4. A reciprocating mechanism comprising an enclosing casing, a continuously rotatable shaft journalled in said casing parallel to said continuously rotatable shaft, a take-off shaft journalled in said casing, and means connected between said shafts for imparting rotary movement successively in opposite directions to said take-off shaft, said means including a cam mounted on said rotatable shaft, said cam having peripheral face portions, a guide on a wall of said casing, a slidable member movable in said guide and having cam engaging portions, said slidable member having a rack disposed along one side of said cam and operating connections between said rack and said take-off shaft including a gear in engagement with said rack.

5. A reciprocating mechanism comprising an enclosing casing, a continuously rotatable shaft journalled in said casing, a take-off shaft journalled in said casing, and means connected between said shafts for imparting movement successively in opposite directions to said take-off shaft, said means including an intermediate shaft driven from said rotatable shaft, a cam mounted on said intermediate shaft, a guide on a wall of said casing, a slidable member movable in said guide and having spaced cam engaging portions, a rack on said slidable member, a gear mounted on said intermediate shaft and freely movable with respect thereto in engagement with said rack, and operating connections between said gear and said take-off shaft.

6. A reciprocating mechanism comprising an enclosing casing, a continuously rotatable shaft journalled in said casing, a take-off shaft journalled in said casing, and means connected between said shafts for imparting movement in opposite directions to said take-off shaft, said means including an intermediate shaft, gears connecting said rotatable shaft and said intermediate shaft for actuating said intermediate shaft, a cam mounted on said intermediate shaft, said cam having opposed eccentric face portions, a guide on a wall of said casing, a slidable member movable in said guide and having spaced cam face engaging portions, a rack on said slidable member, take-off gears mounted on said intermediate shaft and freely movable with respect thereto, one of said take-off gears being in engagement with said rack, and a gear on said take-off shaft in engagement with one of said take-off gears.

7. A reciprocating mechanism including a continuously rotatable shaft, a cam carried by said rotatable shaft, a member mounted for slidable movement and having spaced portions for continuous and simultaneous engagement with opposed face portions of said cam, said cam having portions for oscillating said slidably mounted member, said slidable member including a rack, a gear in engagement with said rack, and a take-off shaft driven by said gear.

WARREN P. GRIFFITHS.